US012804511B2

(12) United States Patent
Zhang

(10) Patent No.: US 12,804,511 B2
(45) Date of Patent: Nov. 17, 2026

(54) SIGNAL DETECTION METHOD AND APPARATUS, ELECTRONIC DEVICE, AND COMPUTER READABLE STORAGE MEDIUM

(71) Applicant: SANECHIPS TECHNOLOGY CO., LTD., Shenzhen (CN)

(72) Inventor: Dingming Zhang, Shenzhen (CN)

(73) Assignee: SANECHIPS TECHNOLOGY CO., LTD., Shenzhen (CN)

( * ) Notice: Subject to any disclaimer, the term of this patent is extended or adjusted under 35 U.S.C. 154(b) by 208 days.

(21) Appl. No.: 18/685,579

(22) PCT Filed: Apr. 20, 2022

(86) PCT No.: PCT/CN2022/087891
§ 371 (c)(1),
(2) Date: Feb. 22, 2024

(87) PCT Pub. No.: WO2023/024535
PCT Pub. Date: Mar. 2, 2023

(65) Prior Publication Data
US 2024/0349163 A1 Oct. 17, 2024

(30) Foreign Application Priority Data
Aug. 23, 2021 (CN) ........................ 202110973441.X

(51) Int. Cl.
*H04W 40/20* (2009.01)
*H04L 25/02* (2006.01)

(52) U.S. Cl.
CPC ......... *H04W 40/20* (2013.01); *H04L 25/0242* (2013.01)

(58) Field of Classification Search
CPC .... H04W 40/20; H04L 25/0242; G06F 18/22; G06N 5/00; H04B 7/0413; H04B 7/08
See application file for complete search history.

(56) References Cited

U.S. PATENT DOCUMENTS

2012/0134451 A1* 5/2012 Patel ................. H04L 25/03203 375/341
2012/0147831 A1* 6/2012 Golitschek ............ H04L 1/0028 370/329
2014/0185716 A1 7/2014 Aubert

FOREIGN PATENT DOCUMENTS

CN 109660473 B * 5/2021 ....... H04L 25/03242
KR 20190025230 A * 3/2019 ........... H04B 7/0413

OTHER PUBLICATIONS

European Patent Office, The Extended European Search Report dated Jul. 3, 2025, for corresponding EP application No. 228598892

(Continued)

*Primary Examiner* — Kyaw Z Soe
(74) *Attorney, Agent, or Firm* — Li & Cai Intellectual Property (USA) Office

(57) ABSTRACT

The present disclosure provides signal detection method and apparatus, an electronic device, and a computer readable storage medium. The signal detection method includes: dividing nodes in a $M_T$-th transmitting layer into M blocks, with $M_T$ representing a number of transmitting layers and M being an integer greater than or equal to 2; searching for a path corresponding to a central node of each block to obtain M paths, with the central node of each block being a node corresponding to a path with a smallest Euclidean distance among all nodes of the block; selecting N paths with smallest Euclidean distances from the M paths, with N being an integer less than M; searching for paths corresponding to all nodes of blocks where N nodes respectively corresponding to the N paths are located to obtain P paths; and selecting a path with a smallest Euclidean distance from the P paths.

9 Claims, 3 Drawing Sheets

(56) References Cited

OTHER PUBLICATIONS

Ruijuan Ma, et al., "Adaptive low-complexity constellationreduction aided detection in MIMO systems employing high-order modulation", 2013 IEEE Wireless Communications and Networking Conference (WCNC), Apr. 1, 2013.
Zafraratia Eduardo, et al., "K-Best Sphere Decoding Algorithm for Long Prediction Horizon FCS-MPC", IEEE Transactions on Industrial Electronics, IEEE Service Center, Piscataway, NJ, USA, vol. 69, No. 8, Aug. 19, 2021.

* cited by examiner

| | | | | | | | | | | | | | | | |
|---|---|---|---|---|---|---|---|---|---|---|---|---|---|---|---|
| ● 008 | ● 024 | ● 056 | ● 040 | ● 104 | ● 120 | ● 088 | ● 072 | ● 200 | ● 216 | ● 248 | ● 232 | ● 168 | ● 184 | ● 152 | ● 136 |
| ● 009 | ● 025 | ● 057 | ● 041 | ● 105 | ● 121 | ● 089 | ● 073 | ● 201 | ● 217 | ● 249 | ● 233 | ● 169 | ● 185 | ● 153 | ● 137 |
| ● 011 | ● 027 | ● 059 | ● 043 | ● 107 | ● 123 | ● 091 | ● 075 | ● 203 | ● 219 | ● 251 | ● 235 | ● 171 | ● 187 | ● 155 | ● 139 |
| ● 010 | ● 028 | ● 058 | ● 042 | ● 106 | ● 122 | ● 090 | ● 074 | ● 202 | ● 218 | ● 250 | ● 234 | ● 170 | ● 186 | ● 154 | ● 138 |
| ● 014 | ● 030 | ● 062 | ● 046 | ● 110 | ● 126 | ● 094 | ● 078 | ● 206 | ● 222 | ● 254 | ● 238 | ● 174 | ● 190 | ● 158 | ● 142 |
| ● 015 | ● 031 | ● 063 | ● 047 | ● 111 | ● 127 | ● 095 | ● 079 | ● 207 | ● 223 | ● 255 | ● 239 | ● 175 | ● 191 | ● 159 | ● 143 |
| ● 013 | ● 029 | ● 061 | ● 045 | ● 109 | ● 125 | ● 093 | ● 077 | ● 205 | ● 221 | ● 253 | ● 237 | ● 173 | ● 189 | ● 157 | ● 141 |
| ● 012 | ● 028 | ● 060 | ● 044 | ● 108 | ● 124 | ● 092 | ● 076 | ● 204 | ● 220 | ● 252 | ● 236 | ● 172 | ● 188 | ● 156 | ● 140 |
| ● 004 | ● 020 | ● 052 | ● 036 | ● 100 | ● 116 | ● 084 | ● 068 | ● 196 | ● 212 | ● 244 | ● 228 | ● 164 | ● 180 | ● 148 | ● 132 |
| ● 005 | ● 021 | ● 053 | ● 037 | ● 101 | ● 117 | ● 085 | ● 069 | ● 197 | ● 213 | ● 245 | ● 229 | ● 165 | ● 181 | ● 149 | ● 133 |
| ● 007 | ● 023 | ● 055 | ● 039 | ● 103 | ● 119 | ● 087 | ● 071 | ● 199 | ● 215 | ● 247 | ● 231 | ● 167 | ● 183 | ● 151 | ● 135 |
| ● 006 | ● 022 | ● 054 | ● 038 | ● 102 | ● 118 | ● 086 | ● 070 | ● 198 | ● 214 | ● 246 | ● 230 | ● 166 | ● 182 | ● 150 | ● 134 |
| ● 002 | ● 018 | ● 050 | ● 034 | ● 098 | ● 114 | ● 082 | ● 066 | ● 194 | ● 210 | ● 242 | ● 226 | ● 162 | ● 178 | ● 146 | ● 130 |
| ● 003 | ● 019 | ● 051 | ● 083 | ● 067 | ● 115 | ● 083 | ● 067 | ● 195 | ● 211 | ● 243 | ● 227 | ● 163 | ● 179 | ● 147 | ● 131 |
| ● 001 | ● 017 | ● 049 | ● 081 | ● 065 | ● 113 | ● 081 | ● 065 | ● 193 | ● 209 | ● 241 | ● 225 | ● 161 | ● 177 | ● 145 | ● 129 |
| ● 000 | ● 016 | ● 048 | ● 080 | ● 064 | ● 112 | ● 080 | ● 064 | ● 192 | ● 208 | ● 240 | ● 224 | ● 160 | ● 176 | ● 144 | ● 128 |

SIGNAL DETECTION METHOD AND APPARATUS, ELECTRONIC DEVICE, AND COMPUTER READABLE STORAGE MEDIUM

CROSS-REFERENCE TO RELATED APPLICATION

This application is a National Phase Application filed under 35 U.S.C. 371 as a national stage of PCT/CN2022/087891, filed on Apr. 20, 2022, the disclosure of which is hereby incorporated by reference in its entirety.

TECHNICAL FIELD

Embodiments of the present disclosure relate to the field of wireless communications, and in particular, to signal detection method and apparatus, an electronic device, and a computer readable storage medium.

BACKGROUND

At present, signal detection methods are generally implemented by equalization detection algorithms, and common equalization detection algorithms are divided into linear equalization algorithms and nonlinear equalization algorithms. The linear equalization algorithms include the Zero Forcing (ZF) algorithm, the Minimum Mean Square Error (MMSE) algorithm and the like, are relatively low in complexity, are easily implemented, but have average performance. The nonlinear equalization algorithms include the Successive Interference Cancellation (SIC) detection algorithm, the Maximum Likelihood (ML) detection algorithm, the Sphere Decoding (SD) algorithm and the like. The ML algorithm has theoretical best performance, but computation complexity of the ML detection algorithm increases exponentially with an increase of a modulation order and data streams. When the data streams are greater than or equal to 4 layers and the modulation order exceeds 16 Quadrature Amplitude Modulation (QAM), implementation feasibility of the ML algorithm almost does not exist. In order to obtain an effect close to performance of the ML algorithm within acceptable complexity, the SD algorithm is proposed in academic circles. Through years of research, optimization and improvement, complexity and a computational delay of the SD algorithm have been effectively reduced, and the SD algorithm has been applied to a plurality of Multiple Input Multiple Output (MIMO) communication systems. Engineers have also proposed many SD algorithms based on Very Large Scale Integration (VLSI) to further improve efficiency and a delay of the SD algorithm, so as to facilitate development and design of chips.

The SD algorithm limits a search scale of a tree diagram by means of pruning and controlling of search paths, and obtains nodes corresponding to the ML algorithm with relative low complexity. There is a plurality of implementation schemes of the SD algorithm, and different implementation schemes are different in that different methods are adopted to simplify search of the tree diagram, so that an optimal node may be obtained within acceptable computational complexity and within an acceptable delay range. Important SD algorithms include the depth-first search algorithm and the K-Best algorithm.

A processing flow of the K-Best algorithm roughly includes: selecting, from nodes in an $M_T$ layer, K nodes with smallest Euclidean distances, with $M_T$ being the number of transmitting antennas; extending child nodes of the K nodes, with a total of $K\times2^{Q_T-1}$ nodes in an $M_{T-1}$ layer being accessed; and selecting K nodes, from the $K\times2^{Q_T-1}$ nodes in the $M_{T-1}$ layer, with the smallest Euclidean distances; extending towards an $M_{T-2}$ layer, and so on, until the above operations are performed for a first layer. Although the K-Best algorithm cannot guarantee that an ML solution is obtained by search, computational complexity of the K-Best algorithm is predictable, and the K-Best algorithm is more suitable for being implemented by chip accelerators. Most of practically applied algorithms may be seen as variants of the K-Best algorithm.

With rapid development of mobile communication technology, requirements of communication systems on high-speed transmission, large capacity, and low delay become higher and higher. The K-Best algorithm also has a problem of how to reduce an algorithm implementation delay as much as possible on a premise of ensuring algorithm performance.

SUMMARY

The present disclosure provides a signal detection method and apparatus, an electronic device, and a computer readable storage medium.

In a first aspect of the present disclosure, there is provided a signal detection method, including: dividing nodes in a $M_T$-th transmitting layer into M blocks, wherein $M_T$ represents the number of transmitting layers, and M is an integer greater than or equal to 2; searching for a path corresponding to a central node of each block to obtain M paths, wherein the central node of each block is a node corresponding to a path with a smallest Euclidean distance among all nodes of the block; selecting N paths with smallest Euclidean distances from the M paths, wherein N is an integer less than M; searching for paths corresponding to all nodes of blocks where N nodes respectively corresponding to the N paths are located to obtain P paths; and selecting a path with a smallest Euclidean distance from the P paths.

In a second aspect of the present disclosure, there is provided an electronic device, including: at least one processor; and a memory having stored thereon at least one program which, when executed by the at least one processor, implements the above signal detection method.

In a third aspect of the present disclosure, there is provided a computer readable storage medium having stored thereon a computer program which, when executed by a processor, implements the above signal detection method.

In a fourth aspect of the present disclosure, there is provided a signal detection apparatus, including: a division module configured to divide nodes in a $M_T$-th transmitting layer into M blocks, wherein $M_T$ represents a number of transmitting layers, and M is an integer greater than or equal to 2; a first path search module configured to search for a path corresponding to a central node of each block to obtain M paths, wherein the central node of each block is a node corresponding to a path with a smallest Euclidean distance among all nodes of the block; a first path selection module configured to select N paths with smallest Euclidean distances from the M paths, wherein N is an integer less than M; a second path search module configured to search for paths corresponding to all nodes of blocks where N nodes respectively corresponding to the N paths are located to obtain P paths; and a second path selection module configured to select a path with a smallest Euclidean distance from the P paths.

DETAIL DESCRIPTION OF EMBODIMENTS

Exemplary embodiments of the present disclosure will be described more fully below with reference to the drawings, but the exemplary embodiments described herein may be embodied in different forms and should not be interpreted as being limited to the embodiments described herein. Rather, the embodiments are provided to make the present disclosure thorough and complete, and are intended to enable those of ordinary skill in the art to fully understand the scope of the present disclosure.

In order to enable those of ordinary skill in the art to better understand the technical solutions of the present disclosure, a signal detection method and apparatus, an electronic device, and a computer readable storage medium provided in the present disclosure are described in detail below with reference to the drawings.

Exemplary embodiments of the present disclosure will be described more fully below with reference to the drawings, but the exemplary embodiments described herein may be embodied in different forms and should not be interpreted as being limited to the embodiments described herein. Rather, the embodiments are provided to make the present disclosure thorough and complete, and are intended to enable those of ordinary skill in the art to fully understand the scope of the present disclosure.

The embodiments described herein and the features therein can be combined with one another if no conflict is incurred.

The term “and/or” used herein includes any and all combinations of at least one associated listed item.

The terms used herein are merely used to describe specific embodiments, and are not intended to limit the present disclosure. As used herein, “a” and “the” which indicate a singular form are intended to include a plural form, unless expressly stated in the context. It should be further understood that the term(s) “include” and/or “be made of” used herein indicate(s) the presence of the described features, integers, operations, elements and/or components, but do not exclude the presence or addition of one or more other features, integers, operations, elements, components and/or combinations thereof.

Unless otherwise defined, all terms (including technical and scientific terms) used herein have the same meaning as commonly understood by those of ordinary skill in the art. It should be further understood that terms, such as those defined in commonly used dictionaries, should be interpreted as having a meaning that is consistent with a meaning in the context of the related technology and the background of the present disclosure, and should not be interpreted in an idealized or overly formal sense unless expressly so defined herein.

Figure 1:
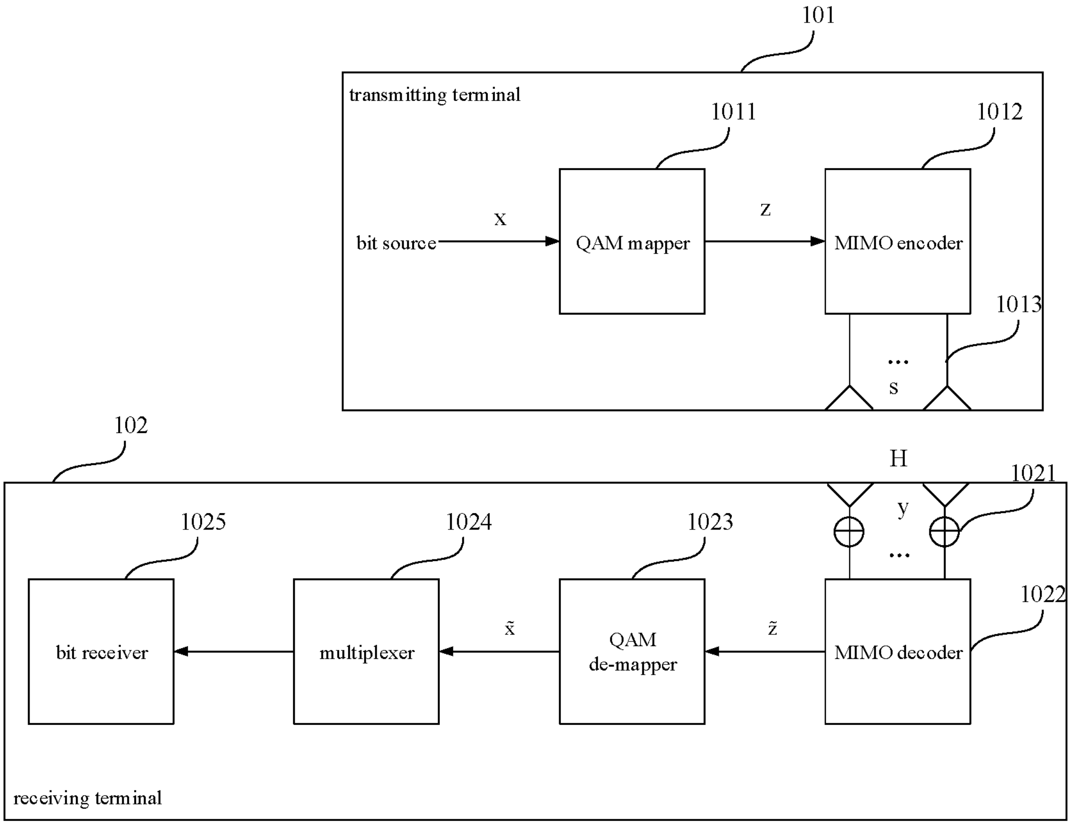
FIG. 1 is a schematic diagram illustrating signal transmission of an MIMO communication system.

FIG. 1 is a schematic diagram illustrating signal transmission of an MIMO communication system.

As shown in FIG. 1, the MIMO communication system includes a transmitting terminal 101 and a receiving terminal 102. The transmitting terminal 101 includes a QAM mapper 1011 configured to map an input bit source x to a symbol z; an MIMO encoder 1012 configured to encode the symbol z to obtain a signal s; and a transmitting antenna 1013 configured to transmit the signal s. The receiving terminal 102 includes a receiving antenna 1021 configured to receive a signal y; an MIMO decoder 1022 configured to detect the signal y using a signal detection method, obtain an estimated signal $\tilde{s}$ as a detection result, and decode the estimated signal $\tilde{s}$ to obtain an estimated symbol $\tilde{z}$; a QAM de-mapper 1023 configured to de-map the estimated symbol $\tilde{z}$ to obtain an estimated bit $\tilde{x}$; a multiplexer 1024 configured to restoring the estimated bit $\tilde{x}$ to data of original data (i.e., de-layer mapping); and a bit receiver 1025 configured to receive the estimated bit $\tilde{x}$.

A mathematical model of the receiving terminal 102 of the MIMO system may be expressed as a formula (1).

$$y = Hs + n \tag{1}$$

Where y represents a signal received by the receiving terminal 102, H represents a channel estimation matrix, s represents a signal transmitted by the transmitting terminal 101, and n represents noise.

It is assumed that dimensions of the signal estimation matrix H is $M_R \times M_T$, where $M_R \geq M_T$. The channel estimation matrix H is subjected to QR decomposition by a formula (2).

$$H = QR \tag{2}$$

Where the Q matrix is a unitary matrix with dimensions of $M_R \times M_T$ and satisfies $Q^H$. Q=I, and the R matrix is an upper triangular matrix with dimensions of $M_T \times M_T$, with elements on a diagonal being real numbers.

The formula (1) is transformed to obtain a formula (3).

$$Q^H \cdot y = Q^H \cdot Hs + Q^H \cdot n = Rs + Q^H \cdot n \tag{3}$$

By denoting $Q^H \cdot y$ as $\hat{y}$ and denoting $Q^H \cdot n$ as $\hat{n}$, a formula (4) is obtained.

$$\hat{y} = Rs + \hat{n} \text{ (4)} \tag{4}$$

The ML algorithm performs signal detection according to a formula (5).

$$\tilde{s} = \underset{s \in O^{M_T}}{\mathrm{argmin}} \|\hat{y} - Rs\|^2 \tag{5}$$

Where $O^{M_T}$ represents a set of $M_T$-dimensional matrices taking constellation points as elements.

In short, in a high-dimensional Euclidean space, an $M_T$-dimensional vector $\tilde{s}$ formed by the constellation points is looked up to make a high-dimensional Euclidean distance between $R\tilde{s}$ and $\hat{y}$ is smallest. However, it is not easy to directly obtain the high-dimensional Euclidean distance, so that a general method is calculating a Euclidean distance in each dimension of the $M_T$-dimensional Euclidean space, and then calculating a total $M_T$-dimensional Euclidean distance.

With a characteristic that the R matrix is the upper triangular matrix, a Euclidean distance of a constellation point in an i-th layer may be expressed by a formula (6).

$$|e_i|^2 = \left|\hat{y}_i - \sum_{j=i}^{M_T-1} R_{i,j}s_j\right|^2 \quad (6)$$

Where $e_i$ is the Euclidean distance of the constellation point in the i-th layer, $\hat{y}_i$ is a product of a signal $y_i$ received by an i-th receiving antenna and an i-th column of the $Q^H$ matrix, $R_{i,j}$ is an element in an i-th row and a j-th column of the R matrix, and $s_j$ is a signal transmitted by a j-th transmitting antenna.

Therefore, the SD algorithm is finding a value of s of each layer with a smallest Euclidean distance $$\sum_{i=1}^{M_T} |e_i|^2.$$

Figure 2:
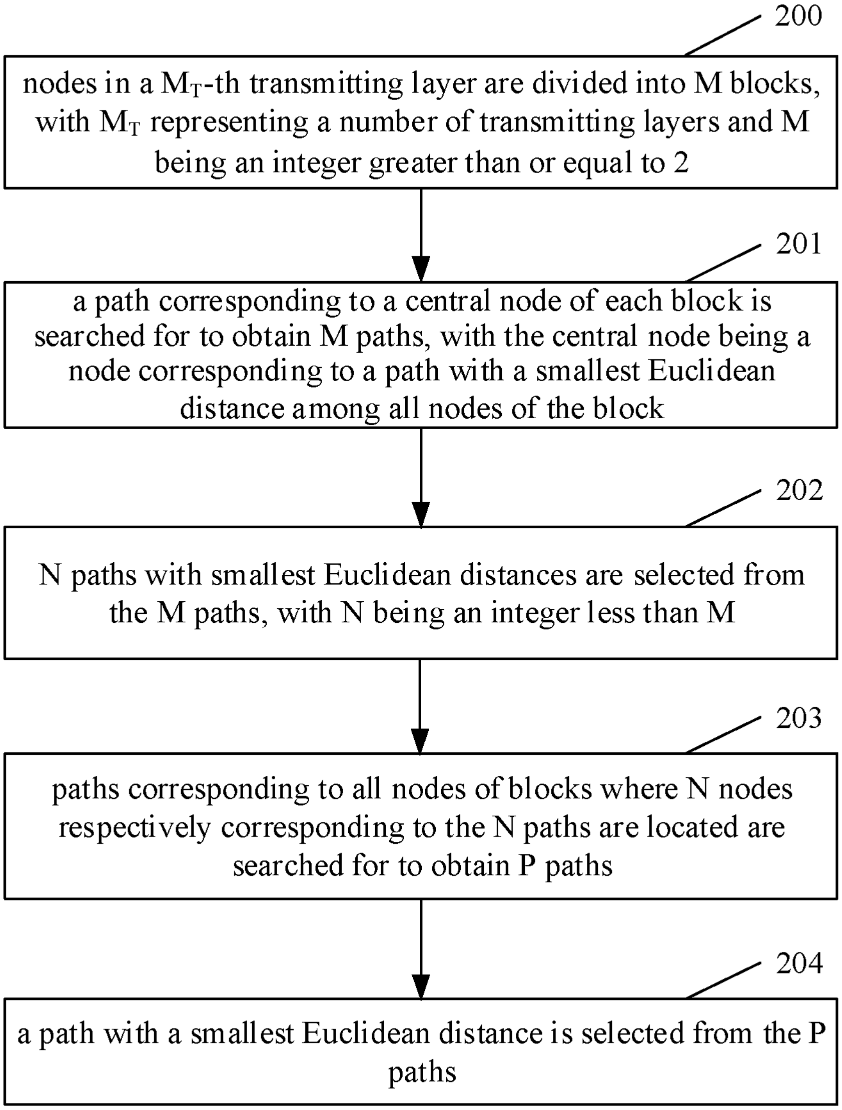
FIG. 2 is a flowchart illustrating a signal detection method according to an embodiment of the present disclosure.

FIG. 2 is a flowchart illustrating a signal detection method according to an embodiment of the present disclosure.

Referring to FIG. 2, the signal detection method according to the embodiment of the present disclosure includes operations 200 to 204.

In the operation 200, nodes in a $M_T$-th transmitting layer are divided into M blocks, with $M_T$ representing a number of transmitting layers and M being an integer greater than or equal to 2.

Figures 3, 4:
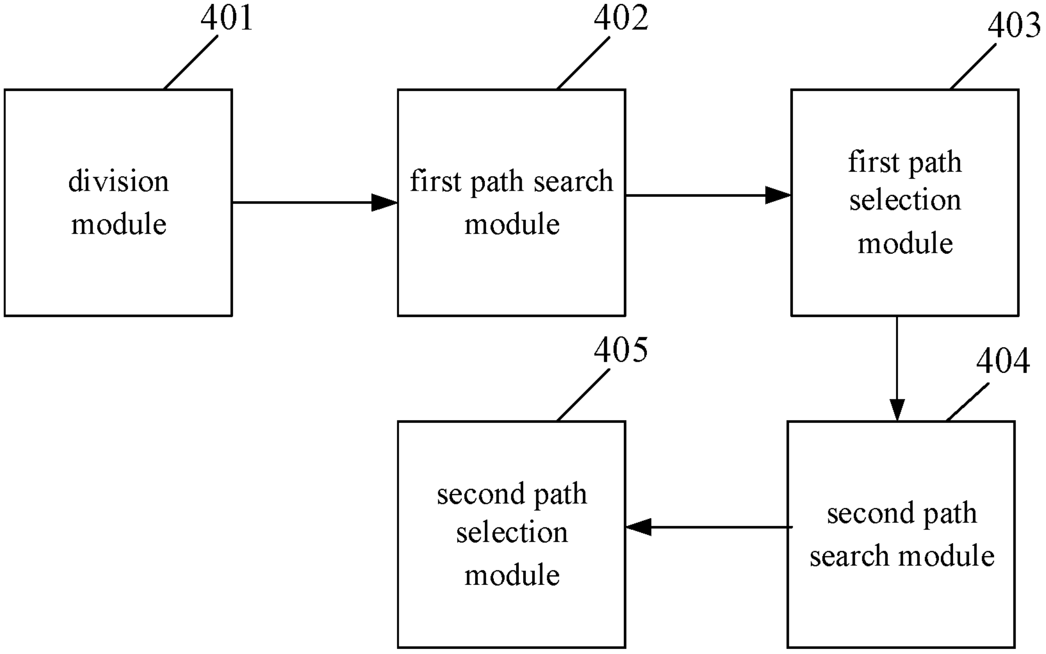
FIG. 3 is a schematic diagram of a feasible implementation of dividing nodes in an $M_T$-th layer into M blocks according to an embodiment of the present disclosure.
FIG. 4 is a block diagram of a signal detection apparatus according to an embodiment of the present disclosure.

According to the embodiment of the present disclosure, M is determined according to computational complexity and accuracy. The larger M is, the higher the computational complexity is, and the higher the accuracy is; and the smaller M is, the lower the computational complexity is, and the lower the accuracy is. A specific value of M may be obtained by simulation. For example, for a modulation order of 256 QAM, a number of the nodes in the $M_T$-th transmitting layer is 256, so the 256 nodes may be divided into 36 blocks as shown in FIG. 3.

A number of nodes included in each of the M blocks is not limited in the present disclosure, but it is desired to ensure as much as possible that the number of the nodes included in each block is the same when the nodes are divided. For example, FIG. 3 is a schematic diagram of a feasible implementation. As can be seen from FIG. 3, the number of nodes included in each of large parts of the blocks is 9; the number of nodes included in each of small parts of the blocks is 3; and the number of nodes included in one of the blocks is 1.

In the operation 201, a path corresponding to a central node of each block is searched for to obtain M paths, with the central node being a node corresponding to a path with a smallest Euclidean distance among all nodes of the block.

In the embodiment of the present disclosure, searching for the path corresponding to the central node of each block refers to searching for the path with the smallest Euclidean distance among all paths including the central node of the block. Any search method known to those of ordinary skill in the art may be adopted to search for the path corresponding to the central node of each block to obtain the M paths.

For example, for 2 transmitting antennas and a modulation order of 256 QAM, the formula (4) may be expanded as:

$$\begin{bmatrix} \hat{y}_0 \\ \hat{y}_1 \end{bmatrix} = \begin{bmatrix} R_{00} & R_{01} \\ 0 & R_{11} \end{bmatrix} \begin{bmatrix} s_0 \\ s_1 \end{bmatrix} + \begin{bmatrix} \hat{n}_0 \\ \hat{n}_1 \end{bmatrix}.$$

Since s1 is fixed, it is just needed to find a value of $s_0$ that minimizes the Euclidean distance dst according to the formula $dst=|\hat{y}_1-R_{11}\times s_1|^2+|\hat{y}_0-R_{01}\times s_1-R_{00}\times s_0|^2$.

According to the embodiment of the present disclosure, in order to improve the accuracy, in the process of searching for the path corresponding to the central node of each block to obtain the M paths, a last column of the used Q matrix is a column with the minimum energy.

In some exemplary embodiments, energy of a certain column of the Q matrix refers to a sum of squares of all elements in the column.

According to the embodiment of the present disclosure, in order to reduce a delay, the M paths may be divided into L groups, with L being an integer greater than or equal to 2 and less than or equal to M. Paths in one group are searched for each time, so that, after the search of the paths in one group is completed, the paths in the group that has already completed the search may be sorted while search of paths in a next group is carried out.

In the embodiment of the present disclosure, the larger the value of L is, the higher operation parallelism is, and the higher requirement on hardware is. Therefore, the value of L needs to be determined in consideration of operation parallelism together with hardware conditions.

In the operation 202, N paths with smallest Euclidean distances are selected from the M paths, with N being an integer less than M.

According to the embodiment of the present disclosure, N is determined according to the computational complexity and the accuracy. The larger N is, the higher the computational complexity is, and the higher the accuracy is; and the smaller N is, the lower the computational complexity is, and the lower the accuracy is. A specific value of N may be obtained by simulation.

According to the embodiment of the present disclosure, selecting the N paths with the smallest Euclidean distances from the M paths includes: sorting Euclidean distances of the M paths to obtain a first sorting result; and selecting the N paths with the smallest Euclidean distances from the first sorting result.

According to the embodiment of the present disclosure, in order to reduce the delay, a bitonic sorting algorithm may be adopted to sort the Euclidean distances of the M paths. According to the embodiment of the present disclosure, in order to reduce the delay, in a case where the M blocks are divided into the L groups during the search of the path corresponding to the central node of each block, when the Euclidean distances of the M paths are sorted by the bitonic sorting algorithm, after the path corresponding to the central node of each block included in one group is obtained by search, the Euclidean distances of the paths corresponding to the respective central nodes of all the blocks included in the group may be sorted by the bitonic sorting algorithm to obtain a second sorting result of the group. For example, after the path corresponding to the central node of each block included in a $k_1$-th group is found by search, the Euclidean distances of the paths corresponding to the respective central nodes of all the blocks included in the $k_1$-th group are sorted by the bitonic sorting algorithm to obtain a second sorting result of the $k_1$-th group, with $k_1$ being an integer greater than or equal to 1 and less than or equal to L.

After the paths corresponding to the central nodes of all the blocks included in each of different groups are respectively sorted, the sorting results of the different groups need to be further sorted.

According to an embodiment of the present disclosure, selecting the N paths with the smallest Euclidean distances from the M paths includes: dividing the M blocks into the L groups, with L being an integer greater than or equal to 2 and less than or equal to M; for each group, searching for the path corresponding to the central node of each block included in the group to obtain the paths corresponding to the group; for each group, sorting Euclidean distances of the paths corresponding to the group by the bitonic sorting algorithm to obtain a second sorting result of the group; dividing the L groups into A parts, with A being an integer greater than or equal to 1 and less than or equal to L; for each part, sorting the Euclidean distances of the paths corresponding to all the groups included in the part by the bitonic sorting algorithm to obtain a third sorting result of the part, based on the second sorting result of each group included in the part; selecting N paths with the smallest Euclidean distances from the third sorting result of each part to obtain AN paths; and selecting the N paths with the smallest Euclidean distances from the AN paths.

According to an embodiment of the present disclosure, the operation of for each part, based on the second sorting result of each group included in the part, sorting the Euclidean distances of the paths corresponding to all the groups included in the part by the bitonic sorting algorithm to obtain the third sorting result of the part includes: for a $k_2$-th group included in the part, selecting paths from the second sorting result of the $k_2$-th group, and sorting, by the bitonic sorting algorithm, the paths selected from the second sorting result of the $k_2$-th group and paths selected from a previous sorting result to obtain a current sorting result, with $k_2$ being an integer greater than or equal to 2 and less than or equal to the number of the groups included in the part, and the previous sorting result being the second sorting result of a first group of the part when $k_2$ is 2; and adding $k_2$ by 1, continuing to execute the operations of selecting the paths from the second sorting result of the $k_2$-th group and sorting, by the bitonic sorting algorithm, the paths selected from the second sorting result of the $k_2$-th group and the paths selected from the previous sorting result to obtain the current sorting result until all the groups in the part are traversed, and outputting a final sorting result as the third sorting result corresponding to the part. In a case where a number of paths corresponding to respective center nodes of all the blocks included in the $k_2$-th group is greater than N, the paths selected from the second sorting result of $k^2$-th group are the N paths with the smallest Euclidean distances in the second sorting result of the $k^2$-th group; and in a case where the number of the paths corresponding to the respective center nodes of all the blocks included in the $k^2$-th group is less than or equal to N, the paths selected from the second sorting result of the $k^2$-th group are all paths corresponding to the respective center nodes of all the blocks included in the $k^2$-th group. Moreover, in a case where the number of paths in the previous sorting result is greater than N, the paths selected from the previous sorting result are the N paths with the smallest Euclidean distances in the previous sorting result; and in a case where the number of the paths in the previous sorting result is less than or equal to N, the paths selected from the previous sorting result are all paths in the previous sorting result.

According to the embodiment of the present disclosure, A is determined according to a system delay and a delay of the bitonic sorting algorithm, for example, A is a ratio of the delay of the bitonic sorting algorithm to the system delay.

For example, assuming that A is 2, for a first part, after the second sorting result of a first group and the second sorting result of a second group are obtained, if the number of the paths in each of the groups is greater than N, the N paths with the smallest Euclidean distances are selected from the first group according to the second sorting result of the first group, the N paths with the smallest Euclidean distances are selected from the second group according to the second sorting result of the second group, the Euclidean distances of the N paths selected from the first group and the Euclidean distances of the N paths selected from the second group are sorted by the bitonic sorting algorithm to obtain a primary sorting result of the first part, and the N paths with the smallest Euclidean distances are selected from the primary sorting result of the first part; after the second sorting result of a third group and the second sorting result of a fourth group are obtained, if the number of the paths in each of the third and fourth groups is greater than N, the N paths with the smallest Euclidean distance are selected from the third group according to the second sorting result of the third group, the N paths with the smallest Euclidean distances are selected from the fourth group according to the second sorting result of the fourth group, the Euclidean distances of the N paths selected from the third group and the Euclidean distances of the N paths selected from the fourth group are sorted by the bitonic sorting algorithm to obtain a primary sorting result of a second part, and the N paths with the smallest Euclidean distances are selected from the primary sorting result of the second part; after the second sorting result of a fifth group is obtained, the N paths with the smallest Euclidean distances are selected from the fifth group according to the second sorting result of the fifth group, the N paths selected from the primary sorting result of the first part and the N paths selected from the fifth group are sorted by the bitonic sorting algorithm to obtain a secondary sorting result of the first part, and the N paths with the smallest Euclidean distances are selected from the secondary sorting result of the first part; after the second sorting result of a sixth group is obtained, the N paths with the smallest Euclidean distances are selected from the sixth group according to the second sorting result of the sixth group, the N paths selected from the primary sorting result of the second part and the N paths selected from the sixth group are sorted by the bitonic sorting algorithm to obtain a secondary sorting result of the second part, and the N paths with the smallest Euclidean distances are selected from the secondary sorting result of the second part; and so on, until all the groups in the two parts are traversed to finally obtain the N paths with the smallest European distances in the first part and the N paths with the smallest European distances in the second part, and the N paths with the smallest European distances in the first part are compared with the N paths with the smallest European distances in the second part to obtain the N paths with the smallest European distances in the M paths.

In the operation 203, paths corresponding to all nodes of blocks where N nodes respectively corresponding to the N paths are located are searched for to obtain P paths.

In the embodiment of the present disclosure, P is a sum of the number of all the nodes of the blocks where the N nodes are located.

According to an embodiment of the present disclosure, searching for a path corresponding to a certain node included in the blocks where the N nodes are located refers to searching for a path with a smallest Euclidean distance among all paths including the certain node of the blocks where the N nodes are located. Any search method known to those of ordinary skill in the art may be adopted to search for the path corresponding to the certain node of the blocks where the N nodes are located to obtain the P paths. For example, for 2 transmitting antennas and a modulation order of 256QAM, the formula (4) may be expanded as:

$$\begin{bmatrix}\hat{y}_0\\ \hat{y}_1\end{bmatrix}=\begin{bmatrix}R_{00} & R_{01}\\ 0 & R_{11}\end{bmatrix}\begin{bmatrix}s_0\\ s_1\end{bmatrix}+\begin{bmatrix}\hat{n}_0\\ \hat{n}_1\end{bmatrix}.$$

Since s1 is fixed, it is just needed to find a value of $s_0$ that minimizes the Euclidean distance dst according to the formula $dst=|\hat{y}_1-R_{11}\times s_1|^2+|\hat{y}_0-R_{01}\times s_1-R_{00}\times s_0|^2$.

According to the embodiment of the present disclosure, in the process of searching for the paths corresponding to all the nodes included in the blocks where the N nodes are located to obtain the P paths, a last column of the Q matrix used is the column with the smallest energy.

According to the embodiment of the present disclosure, energy of a certain column of the Q matrix refers to the sum of squares of all elements in the column.

In the operation 204, a path with a smallest Euclidean distance is selected from the P paths.

According to the embodiment of the present disclosure, the path with the smallest Euclidean distance may be obtained by comparing the P paths two by two. For example, the Euclidean distances of any two paths among the P paths are compared to obtain a path with the smaller Euclidean distance; and comparing of the Euclidean distances of any two paths among the obtained paths are continued to obtain a path with the smaller Euclidean distance, until two final paths are obtained, and the Euclidean distances of the two final paths are compared to obtain the path with the smallest Euclidean distance.

A delay of the signal detection method according to the embodiment of the present disclosure is the sum of search delays of (M+P) paths, and an algorithm implementation delay is reduced on a premise of ensuring the algorithm performance.

The present disclosure provides an electronic device including at least one processor; and a memory having stored thereon at least one program which, when executed by the at least one processor, implements the signal detection method described above.

The processor is a device having data processing capability, and includes, but is not limited to, a Central Processing Unit (CPU); and the memory is a device having data storage capability, and includes, but is not limited to, a Random Access Memory (RAM, more specifically, a Synchronous Dynamic RAM (SDRAM), a Double Data Rate SDRAM (DDR SDRAM), etc.), a Read-Only Memory (ROM), an Electrically Erasable Programmable Read-Only Memory (EEPROM), and a flash memory (FLASH).

According to an embodiment of the present disclosure, the processor and the memory are connected to each other through a bus, and then are connected to other components of a computing device.

The present disclosure provides a computer readable storage medium having stored thereon a computer program which, when executed by a processor, implements the signal detection method described above.

FIG. 4 is a block diagram of a signal detection apparatus according to an embodiment of the present disclosure.

In a fourth aspect, referring to FIG. 4, a signal detection apparatus according to an embodiment of the present disclosure includes a division module 401 configured to divide nodes in an $M_T$-th transmitting layer into M blocks, with $M_T$ representing a number of transmitting layers and M being an integer greater than or equal to 2; a first path search module 402 configured to search for a path corresponding to a central node of each block to obtain M paths, with the central node being a node corresponding to a path with a smallest Euclidean distance among all nodes of the block; a first path selection module 403 configured to select N paths with smallest Euclidean distances from the M paths, with N being an integer less than M; a second path search module 404 configured to search for paths corresponding to all nodes of blocks where N nodes respectively corresponding to the N paths are located to obtain P paths; and a second path selection module 405 configured to select a path with a smallest Euclidean distance from the P paths.

According to the embodiment of the present disclosure, the first path selection module 403 is configured to sort Euclidean distances of the M paths by a bitonic sorting algorithm to obtain a first sorting result, and select the N paths with the smallest Euclidean distances from the first sorting result.

According to the embodiment of the present disclosure, the first path search module 402 is further configured to divide the M paths into L groups, with L being an integer greater than or equal to 2 and less than or equal to M; for each group, to search for the path corresponding to the central node of each block included in the group to obtain the paths corresponding to the group; for each group, to sort Euclidean distances of the paths corresponding to the group by the bitonic sorting algorithm to obtain a second sorting result of the group; to divide the L groups into A parts, with A being an integer greater than or equal to 1 and less than or equal to L; for each part, based on the second sorting result of each group included in the part, to sort the Euclidean distances of the paths corresponding to all the groups included in the part by the bitonic sorting algorithm to obtain a third sorting result of the part; to select N paths with the smallest Euclidean distances from the third sorting result of each part to obtain AN paths; and to select the N paths with the smallest Euclidean distances from the AN paths.

For example, the first path selection module 403 is configured to sort, after the path corresponding to the central node of each block included in a $k_1$-th group is found by search, the Euclidean distances of the paths corresponding to the respective central nodes of all the blocks included in the $k_1$-th group by the bitonic sorting algorithm to obtain a second sorting result of the $k_1$-th group, with $k_1$ being an integer greater than or equal to 1 and less than or equal to L.

The first path selection module 403 is configured to sort, for each part, based on the second sorting result of each group included in the part, the Euclidean distances of the paths corresponding to all the groups included in the part by the bitonic sorting algorithm to obtain the third sorting result of the part in a following way: for a $k_2$-th group included in the part, selecting the paths from the second sorting result of the $k_2$-th group, and sorting, by the bitonic sorting algorithm, the paths selected from the second sorting result of the $k_2$-th group and paths selected from a previous sorting result to obtain a current sorting result, with $k_2$ being an integer greater than or equal to 2 and less than or equal to the number of the groups included in the part, and the previous sorting result being the second sorting result of a first group of the part when $k_2$ is 2; and adding $k_2$ by 1, continuing to execute the operations of selecting the paths from the second sorting result of the $k_2$-th group and sorting, by the bitonic sorting algorithm, the paths selected from the second sorting result of the $k_2$-th group and the paths selected from the previous sorting result to obtain the current sorting result until all the groups in the part are traversed, and outputting a final sorting result as the third sorting result corresponding to the part. In a case where the number of paths corresponding to respective center nodes of all the blocks included in the $k_2$-th group is greater than N, the paths selected from the second sorting result of $k_2$-th group are N paths with the smallest Euclidean distances in the second sorting result of the $k_2$-th group; and in a case where the number of the paths corresponding to the respective center nodes of all the blocks included in the $k_2$-th group is less than or equal to N, the paths selected from the second sorting result of the $k_2$-th group are all paths corresponding to the respective center nodes of all the blocks included in the $k_2$-th group. Moreover, in a case where the number of paths in the previous sorting result is greater than N, the paths selected from the previous sorting result are N paths with the smallest Euclidean distance in the previous sorting result; and in a case where the number of the paths in the previous sorting result is less than or equal to N, the paths selected from the previous sorting result are all paths in the previous sorting result.

According to the embodiment of the present disclosure, the second path selection module 405 is configured to compare the Euclidean distances of any two paths among the P paths to obtain a path with the smaller Euclidean distance, compare the Euclidean distances of any two paths among the obtained paths to obtain a path with the smaller Euclidean distance, and so on, until two final paths are obtained, and compare the Euclidean distances of the two final paths to obtain the path with the smallest Euclidean distance.

According to the embodiment of the present disclosure, in the process of searching for the path corresponding to the central node of each block to obtain the M paths or in the process of searching for the paths corresponding to all the nodes of the block where the N nodes are located to obtain the P paths, a last column of the used Q matrix is a column with the minimum energy.

According to the embodiments of the present disclosure, M and N are determined according to computational complexity and accuracy.

Implementation processes of the signal detection apparatus are the same as the specific implementation processes of the signal detection method in the aforesaid embodiments, and thus will not be repeated here.

It should be understood by those of ordinary skill in the art that the functional modules/units in all or some of the operations, the systems, and the devices in the method disclosed above may be implemented as software, firmware, hardware, or suitable combinations thereof. If implemented as hardware, the division between the functional modules/units stated above is not necessarily corresponding to the division of physical components; for example, one physical component may have a plurality of functions, or one function or operation may be performed through cooperation of several physical components. Some or all of the physical components may be implemented as software executed by a processor, such as a central processing unit, a digital signal processor or a microprocessor, or may be implemented as hardware, or may be implemented as an integrated circuit, such as an application specific integrated circuit. Such software may be distributed on a computer-readable medium, which may include a computer storage medium (or a non-transitory medium) and a communication medium (or a transitory medium). As well known by those of ordinary skill in the art, the term “computer storage medium” includes volatile/nonvolatile and removable/non-removable media used in any method or technology for storing information (such as computer-readable instructions, data structures, program modules and other data). The computer storage medium includes, but is not limited to, a Random Access Memory (RAM), a Read-Only Memory (ROM), an Electrically Erasable Programmable Read-Only Memory (EEPROM), a flash memory or other memory techniques, a Compact Disc Read Only Memory (CD-ROM), a Digital Versatile Disc (DVD) or other optical discs, a magnetic cassette, a magnetic tape, a magnetic disk or other magnetic storage devices, or any other medium which can be configured to store desired information and can be accessed by a computer. In addition, it is well known by those of ordinary skill in the art that the communication media generally include computer-readable instructions, data structures, program modules, or other data in modulated data signals such as carrier wave or other transmission mechanism, and may include any information delivery medium.

The present disclosure discloses the exemplary implementations using specific terms, but the terms are merely used and should be merely interpreted as having general illustrative meanings, rather than for the purpose of limitation. Unless expressly stated, it is apparent to those of ordinary skill in the art that features, characteristics and/or elements described in connection with a particular implementation can be used alone or in combination with features, characteristics and/or elements described in connection with other implementations. Therefore, it should be understood by those of ordinary skill in the art that various changes in the forms and the details can be made without departing from the scope of the present disclosure of the appended claims.

What is claimed is:

1. A signal detection method, comprising:

dividing nodes in a MT-th transmitting layer into M blocks, wherein MT represents a number of transmitting layers, and M is an integer greater than or equal to 2;

searching for a path corresponding to a central node of each block to obtain M paths, wherein the central node of each block is a node corresponding to a path with a smallest Euclidean distance among all nodes of the block;

selecting N paths with smallest Euclidean distances from the M paths, wherein N is an integer less than M;

searching for paths corresponding to all nodes of blocks where N nodes respectively corresponding to the N paths are located to obtain P paths; and selecting a path with a smallest Euclidean distance from the P paths, wherein selecting the N paths with the smallest Euclidean distances from the M paths comprises:

dividing the M blocks into L groups, wherein L is an integer greater than or equal to 2 and less than or equal to M;

for each group, searching for a path corresponding to a central node of each block included in the group to obtain paths corresponding to the group;

for each group, sorting Euclidean distances of the paths corresponding to the group by a bitonic sorting algorithm to obtain a second sorting result of the group;

dividing the L groups into A parts, wherein A is an integer greater than or equal to 1 and less than or equal to L;

for each part, sorting Euclidean distances of paths corresponding to all groups included in the part by the bitonic sorting algorithm to obtain a third sorting result of the part, based on the second sorting result of each group included in the part;

selecting N paths with smallest Euclidean distances corresponding to each part from the third sorting result of each part, to obtain AN paths; and selecting the N paths with the smallest Euclidean distances from the AN paths.

2. The signal detection method of claim 1, wherein selecting the N paths with the smallest Euclidean distances from the M paths comprises:

sorting Euclidean distances of the M paths by a bitonic sorting algorithm to obtain a first sorting result; and selecting the N paths with the smallest Euclidean distances from the first sorting result.

3. The signal detection method of claim 1, wherein, for each part, sorting the Euclidean distances of the paths corresponding to all the groups included in the part to obtain the third sorting result of the part, based on the second sorting result of each group included in the part, comprises:

for a k2-th group included in the part, selecting paths from the second sorting result of the k2-th group, and sorting, by the bitonic sorting algorithm, the paths selected from the second sorting result of the k2-th group and paths selected from a previous sorting result to obtain a current sorting result; and adding k2 by 1, continuing to execute the operations of selecting the paths from the second sorting result of the k2-th group and sorting, by the bitonic sorting algorithm, the paths selected from the second sorting result of the k2-th group and paths selected from the previous sorting result to obtain the current sorting result until all the groups in the part are traversed, and outputting a final sorting result as the third sorting result corresponding to the part, wherein k2 is an integer greater than or equal to 2 and less than or equal to a number of the groups included in the part, and the previous sorting result is the second sorting result of a first group of the part when k2 is 2, wherein, in a case where a number of paths corresponding to the k2-th group is greater than N, the paths selected from the second sorting result of k2-th group are N paths with smallest Euclidean distances in the second sorting result of the k2-th group; and in a case where the number of the paths corresponding to the k2-th group is less than or equal to N, the paths selected from the second sorting result of the k2-th group are all paths corresponding to the k2-th group, and in a case where a number of paths in the previous sorting result is greater than N, the paths selected from the previous sorting result are N paths with smallest Euclidean distances in the previous sorting result; and in a case where the number of the paths in the previous sorting result is less than or equal to N, the paths selected from the previous sorting result are all paths in the previous sorting result.

4. The signal detection method of claim 1, wherein selecting the path with the smallest Euclidean distance from the P paths comprises:

comparing Euclidean distances of any two paths among the P paths to obtain a path with a smaller Euclidean distance; and continuing the comparing of Euclidean distances of any two paths among the obtained paths to obtain a path with a smaller Euclidean distance, until two final paths are obtained, and comparing Euclidean distances of the two final paths to obtain the path with the smallest Euclidean distance.

5. The signal detection method of claim 1, wherein in a process of searching for the path corresponding to the central node of each block to obtain the M paths or in a process of searching for the paths corresponding to all the nodes of the blocks where the N nodes respectively corresponding to the N paths are located to obtain the P paths, a last column of a used Q matrix is a column with minimum energy.

6. The signal detection method of claim 1, wherein M and N are determined according to computational complexity and accuracy.

7. An electronic device, comprising:

at least one processor; and a memory having stored thereon at least one program which, when executed by the at least one processor, implements the signal detection method of claim 1.

8. A non-transitory computer readable storage medium having stored thereon a computer program which, when executed by a processor, implements the signal detection method of claim 1.

9. A signal detection apparatus, comprising:

a division unit configured to divide nodes in a MT-th transmitting layer into M blocks; wherein MT represents a number of transmitting layers, and M is an integer greater than or equal to 2;

a first path search unit configured to search for a path corresponding to a central node of each block to obtain M paths, wherein the central node of each block is a node corresponding to a path with a smallest Euclidean distance among all nodes of the block;

a first path selection unit configured to select N paths with smallest Euclidean distances from the M paths, wherein N is an integer less than M;

a second path search unit configured to search for paths corresponding to all nodes of blocks where N nodes respectively corresponding to the N paths are located to obtain P paths; and a second path selection unit configured to select a path with a smallest Euclidean distance from the P paths, wherein the first path selection unit is further configured to: divide the M blocks into L groups, wherein L is an integer greater than or equal to 2 and less than or equal to M;

for each group, search for a path corresponding to a central node of each block included in the group to obtain paths corresponding to the group;

for each group, sort Euclidean distances of the paths corresponding to the group by a bitonic sorting algorithm to obtain a second sorting result of the group;

divide the L groups into A parts, wherein A is an integer greater than or equal to 1 and less than or equal to L;

for each part, sort Euclidean distances of paths corresponding to all groups included in the part by the bitonic sorting algorithm to obtain a third sorting result of the part, based on the second sorting result of each group included in the part;

select N paths with smallest Euclidean distances corresponding to each part from the third sorting result of each part, to obtain AN paths; and select the N paths with the smallest Euclidean distances from the AN paths.

* * * * *